Figures 1, 2:
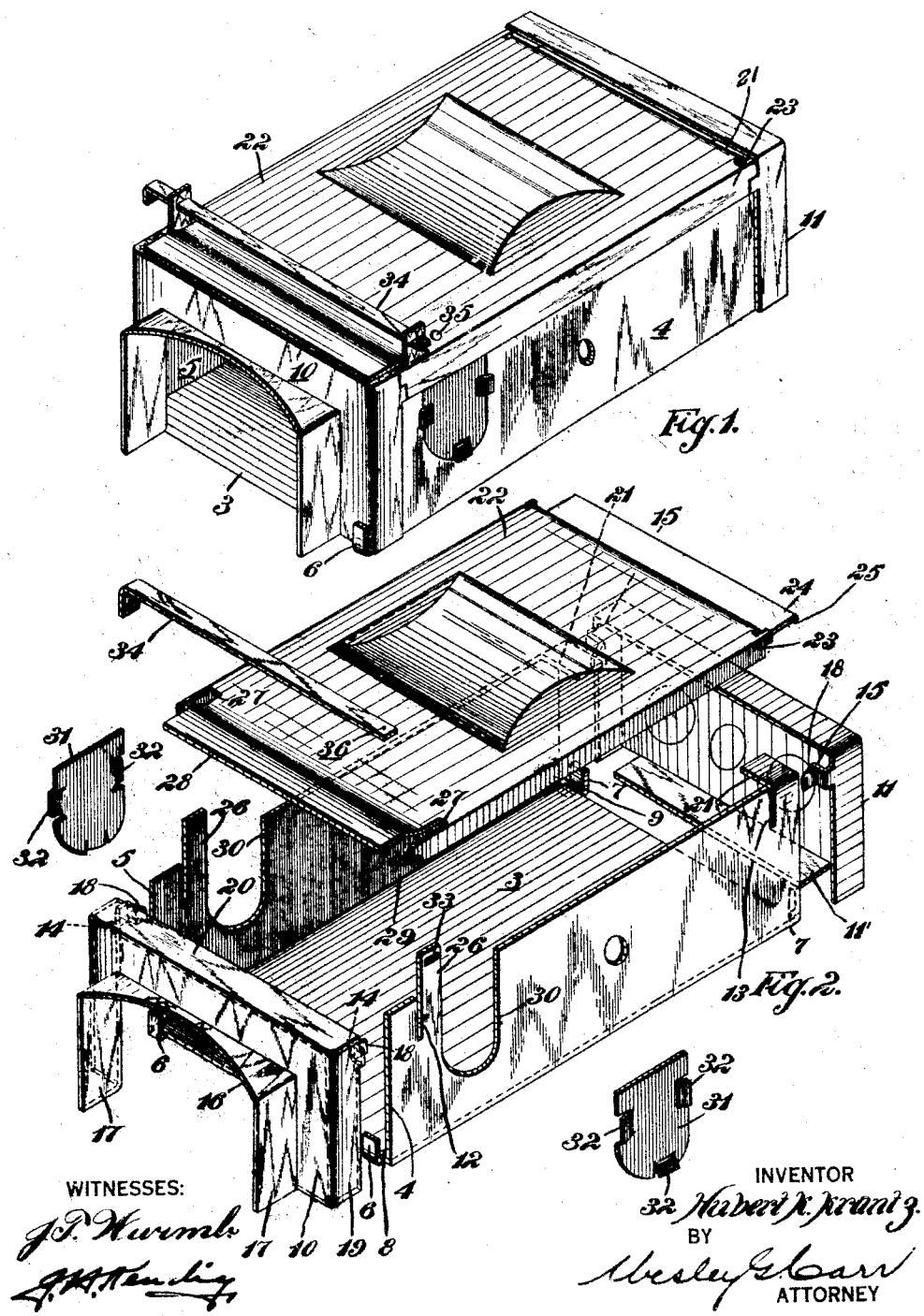

May 17, 1927.

H. K. KRANTZ

SWITCH BOX

Filed Aug. 9, 1920

1,628,889

WITNESSES:

INVENTOR
Herbert K. Krantz
BY
Wesley G. Carr
ATTORNEY

Patented May 17, 1927.

1,628,889

UNITED STATES PATENT OFFICE.

HUBERT K. KRANTZ, OF BROOKLYN, NEW YORK, ASSIGNOR TO WESTINGHOUSE ELECTRIC & MANUFACTURING COMPANY, A CORPORATION OF PENNSYLVANIA.

SWITCH BOX.

Application filed August 9, 1920. Serial No. 402,351.

My invention relates to switch boxes and particularly to the boxes of the type used, in connection with meter installations, for containing fuse-panels and entrance switches.

An object of the invention is to provide a simple metal switch box that may be formed entirely of stamped sheet-metal and in which the parts forming the bottom, sides and cover are so interlocked that they are retained in assembled relation by a single latch bar which serves to hold the cover in closed position.

Another object is to provide a switch box having interchangeable end members, one of which is especially designed for connection with meters of standard type and may be placed at either end of the box, depending upon the end with which the meter is to be associated.

A further object is to provide a switch box requiring no bolts or rivets in its assembly and which, therefore, may be assembled in the field in accordance with the various installation conditions encountered.

Another object is to provide a switch box having interlocked inserts or closures for conduit openings located in the side walls, which may be readily removed or inserted, as desired, and which are retained in operative position by the cover.

Heretofore, boxes for the above purposes have been made of sheet-metal plates riveted together. Such constructions are relatively expensive and several types of boxes are necessary to accommodate various conditions of installation of the wires of the meter in which they are associated. By providing the various elements of the box with interlocking means, boxes suitable for various applications may be assembled by the proper selection of interchangeable parts. To illustrate, the ends of the box may be interchangeable to accommodate various positions of the meter with respect to the box. The same ends and cover may be used with a bottom and side wall having different inlet punchings than those illustrated. Different types of lids may be attached to the body and ends, such as are illustrated in the drawings, to accommodate various types of switches. It will be seen that a great variety of combinations may be obtained for a variety of applications. This elasticity of application is made possible by a box construction, the merits of which will be made apparent throughout the further description of the embodiment of my invention illustrated in the accompanying drawings, wherein:—

Figure 1 is a perspective view of the box showing the parts thereof in assembled relation; and Fig. 2 is an exploded perspective view of the various elements of the box illustrated in Fig. 1.

Referring to the drawings, the box includes a bottom member 3 formed of sheet-metal and having integral side-wall members 4 and 5 bent to a position perpendicular to the plane of the bottom member. The bottom member 3 is provided, at its ends, with integral lugs 6 and 7 which are bent to a position perpendicular to the plane of the bottom member in such manner that spaces 8 and 9, respectively, are provided between the lugs and the ends of the side-wall members, into which the detachable end-wall members 10 and 11 may be interchangeably inserted.

The upper edges of the side-wall members 4 and 5 are provided adjacent the ends thereof with slots 12 and 13 that extend from the upper edge of the wall members toward the bottom member in a direction parallel with the ends of the side-wall members. These slots constitute a portion of an interlocking device for retaining the end-wall members and receive the interlocking lugs 14 and 15, respectively, which are integral parts of the end-wall members 10 and 11, respectively.

The end wall 10 is pressed from sheet-metal and is designed to abut a standard meter having a cylindrical housing and is, therefore, provided with integral wings 16 and 17 which serve to close the space between the cylindrical shell of the meter (not shown) and the switch box. The end-wall member 10 is provided with peripheral flanges 19 and 20 that are designed to fit over the side-wall members and cover, respectively, and extend from a point adjacent to the slots 12 to the ends of the said members. The lugs 14 are integral with the flanges 19 and are bent inwardly at right angles thereto, and are designed to fit within the slots 12 when the end-wall member 10 is moved toward the bottom member, in a plane perpendicular to the plane of the bottom member. The lugs 14 are provided with offset extensions 18 that engage the inner faces of the side members 4 and 5 and support the upper edges of the side members.

The end wall may be detached by simply withdrawing it in a direction opposite that in which it is moved when being assembled. When the end wall is in assembled position, its lower edge lies between the lugs 6 and the ends of the side-wall members 4 and 5, and the lugs 14 lie within the slots 12 and are in interlocked relation with the side-wall members. Lateral displacement of the end members is prevented in an endwise direction by the lugs 6 and 14, and in a crosswise direction by reason of the engagement of the flanges 19 with the outer faces of the side-wall members.

It will be seen from the foregoing that, when the end-wall member 10 is in assembled relation with the side-wall members, relative movement of the former with respect to the latter is possible in but one direction and that direction is away from the bottom member toward the upper edges of the side-wall members.

The end-wall member 11 is similar, in every respect, to the end-wall member 10, with the exception that the wall thereof is not punched out to provide a connection for the meter, but is provided with a "dust-lap" flange 11' which overlaps the interior face of the bottom member 3 and occupies a position between the lugs 7. This end wall is assembled with the side-wall members in a manner similar to that in which the end-wall member 10 is assembled, the lugs 15, which are similar to the lugs 14, fitting within the slots 13 and the inner edge of the end-wall members fitting between the lugs 7 and the ends of the side-wall members. The interlocking mechanisms of the end-wall members are identical, and, consequently, the end-wall members are interchangeable and may be applied to either end of the box to accommodate various conditions of installation.

The ends of the side-wall members 4 and 5 that are adjacent the lugs 7 carried by the bottom member 3 are provided, at their upper edges and between the slots 13 and the ends of the side-wall members, with inwardly-bent integral lugs or wings 21 which occupy positions beneath the upper flange of the end-wall member 11 when that member is in assembled position. These lugs constitute a portion of an interlocking device for retaining the cover 22 in closed position.

The cover 22 is stamped from sheet-metal and includes a flat plate having two marginal flanges 23 struck at right angles to the plate and designed to fit over the outer face of the side plates 4 and 5 and to extend between the side flanges 19 of the end-wall members 10 and 11. One end of the cover is provided with a portion 24 that is depressed to a plane spaced from, and parallel to, that of the cover plate and is designed to slip under the wings 21 when the cover is moved in a longitudinal direction. The lugs 21, therefore, prevent separation of the cover and the side walls in a direction in which the slots 13 extend.

The side-wall members 4 and 5 are provided with projections 26 that extend above the cover 22, when the latter is in closed position, and project through slots 27 formed in the cover 22 between the flanges 23 and the lateral edges of the end of the cover. The end of the cover 22, adjacent to the slot 27, is provided with a portion 28 that is so elevated to a plane spaced from, and parallel to, that of the cover, that it overlies the flange 20 of the end-wall member 10 when the cover is in closed position, and, therefore, prevents detaching movement of the said end-wall member.

As shown, notches 30 are cut in the side-wall members 4 and 5 to accommodate conductor conduits which frequently extend between boxes when the boxes are ganged with a battery of meters. Heretofore, "knockouts" of well-known type have been employed but considerable difficulty is experienced in knocking out the plugs of holes of large diameter, and the box is frequently bent and the enamel broken and marred. To facilitate the operation, while in the field, of providing openings in the side walls, the notches are closed by relatively loose panels 31 having struck-out ears 32 that engage the outer faces of the side-wall members when the panel is in closed position. The panels are held against displacement by the cover and may be readily removed when the cover is open.

The operation of assembly is as follows: The end-wall members 10 and 11 are first held against the upper portion of the ends of the wall members and are then slid toward the bottom members until the lower edge thereof engages the parts of the lugs that are adjacent to the bottom member. The cover 22 is then tilted to an angle to the bottom member, and the end portion 24 is then slipped under the wings 21. The outer end of the cover is then moved toward the box, the cover pivoting, at this time, on the inner edge of the wings 21. When the cover is in closed position, as indicated in Fig. 1, the ends of the projections 26 extend above the outer face of the cover. These projections are provided with slots 33 through which a sealing bar 34 is inserted. The bar lies directly above the cover and prevents removal thereof. The box is locked by means of a seal 35 which is inserted through a hole 36 in the end of the bar.

It will be seen from the foregoing that the cover retains the end members in assembled position and that the cover is retained, at one end, by the said members and, at the other end, by a simple bar which co-operates with the side members in holding the cover in closed position. No rivets or bolts are necessary to hold the elements constituting the box in assembled relation, and the box is simple and inexpensive to manufacture.

While I have described and illustrated but one embodiment of my invention, it will be apparent to those skilled in the art that various changes, modifications, substitutions, additions and omissions may be made in the apparatus described without departing from the spirit and scope of the invention, as set forth by the appended claims.

I claim as my invention:

1. In a box, a bottom member, side members fixed thereto having inwardly-extending projections and slots adjacent thereto, an end member having interlocking members fitting within the said slots in the side members and preventing lateral displacement of the end member with respect to the side members, and a cover having a portion fitting beneath the said projections and preventing relative movement of the end member and the side members in the direction of the slots.

2. In a box, a bottom member, wall members fixed to the bottom member having inwardly-extending projections and slots extending from the upper edge of the fixed wall members toward the bottom member, and detachable wall members having interlocking members fitting within the said slots in the fixed wall members and preventing lateral displacement of the detachable wall members with respect to the fixed wall members, and a cover having a portion fitting beneath the said projections whereby displacement of the cover in the direction in which the said slots extend is prevented, the said cover, when in closed position, engaging the detachable walls and preventing detaching movement thereof.

3. In a box, a bottom member, wall members fixed to the bottom member, detachable wall members co-operating with the fixed wall members and the bottom and movable to operative relation with the fixed members in a direction perpendicular to the plane of the bottom of the box, interlocking means preventing outward lateral displacement of the fixed wall members with respect to the detachable wall members, and a cover interlocking with the said wall members and having interlocking means for preventing movement of the cover in a direction perpendicular to the plane of the bottom member, the said cover engaging the detachable wall members, when in closed position, and preventing detaching movement of the detachable wall members, and means for preventing lateral displacement of the cover.

4. A box comprising a bottom member, a pair of wall members fixed thereto and extending substantially perpendicular to the plane of the bottom member and provided with lateral projections and slots extending from the upper edges of the fixed wall members toward the bottom member, a detachable wall member having interlocking members fitting the slots and movable into operative position with the fixed wall members by movement in a direction perpendicular to the plane of the bottom member, the said interlocking members being adapted to prevent lateral displacement of the detachable wall members with respect to the fixed wall members, and a cover having a portion extending beneath the said projections and over a portion of the detachable wall member, whereby the said portion of the cover and the said detachable wall member are held against separation from the fixed walls in a direction perpendicular to the plane of the bottom member.

5. A box comprising a bottom member having projections extending from opposite edges thereof and at right angles to the plane of the bottom member, wall members fixed to opposite edges of the bottom member and provided with slots extending from the upper edges thereof toward the bottom member, detachable wall members provided with interlocking means fitting into the slots and disposed between the projections on the bottom member and the ends of the fixed wall members, the detachable wall members being movable into operative assembled relation by movement in a direction perpendicular to the plane of the bottom, a cover extending over the detachable wall members and holding them against detaching movement, means at one end of the fixed wall members for engaging the cover and preventing movement of one end of the cover in a direction perpendicular to the plane of the bottom member, and means at the other end of the fixed wall members for preventing movement of the cover laterally but permitting movement of the adjacent end thereof in the said perpendicular direction, and means co-operating with the last said means for preventing movement of the cover in the said perpendicular direction.

In testimony whereof, I have hereunto subscribed my name this second day of August 1920.

HUBERT K. KRANTZ.